United States Patent
Mirabello

[19]

[11] Patent Number: 6,095,025
[45] Date of Patent: Aug. 1, 2000

[54] HANDLING AND SUPPORTING STRUCTURE FOR CUTTING MACHINES

[75] Inventor: Ernesto Mirabello, Vigevano, Italy

[73] Assignee: ATOM S.p.A., Vigevano, Italy

[21] Appl. No.: 08/954,707

[22] Filed: Oct. 20, 1997

[30] Foreign Application Priority Data

Oct. 23, 1996 [IT] Italy .................................. MI96A2206

[51] Int. Cl.⁷ ................................ B26D 7/20; B26F 3/00
[52] U.S. Cl. ................................ 83/177; 83/941; 83/451; 269/289 R; 269/293
[58] Field of Search ........................... 83/177, 451, 941; 269/293, 289 R; 239/120

[56] References Cited

U.S. PATENT DOCUMENTS

| | | | |
|---|---|---|---|
| 245,149 | 8/1881 | Fowler | 269/293 |
| 245,150 | 8/1881 | Fowler | 269/293 |
| 289,594 | 12/1883 | Zieger | 83/451 |
| 1,965,780 | 7/1934 | Odland | 269/44 |
| 2,258,898 | 10/1941 | Lang | 269/293 |
| 3,340,341 | 9/1967 | Bruder . | |
| 4,112,797 | 9/1978 | Pearl | 83/177 |
| 4,137,804 | 2/1979 | Gerber et al. | 83/177 |
| 4,205,835 | 6/1980 | Gerber | 269/289 |
| 4,312,254 | 1/1982 | Pearl | 83/177 |
| 4,685,363 | 8/1987 | Gerber | 83/451 |
| 5,241,733 | 9/1993 | Rosen | 83/451 |
| 5,358,226 | 10/1994 | Arikita | 269/21 |
| 5,372,246 | 12/1994 | Aalst | 198/692 |
| 5,487,930 | 1/1996 | Lockshaw et al. | 428/53 |
| 5,730,431 | 3/1998 | Cattini | 269/21 |

FOREIGN PATENT DOCUMENTS

| | | | |
|---|---|---|---|
| 2651712 | 3/1991 | France | 83/177 |
| 1504016 | 8/1989 | U.S.S.R. | 83/177 |
| 1604549 | 11/1990 | U.S.S.R. | 269/289 |
| 1669651 | 8/1991 | U.S.S.R. | 83/177 |

*Primary Examiner*—M. Rachuba
*Assistant Examiner*—Stephen Choi
*Attorney, Agent, or Firm*—Bucknam and Archer

[57] ABSTRACT

A handling and supporting structure (10) for cutting machines, applicable in particular to machines that perform water jet cutting operations on leathers, hides and synthetic materials, has a plurality of comb-like elements (12), obtained starting from a reduced thickness sheet. These elements are parallel with one another and/or differently oriented, and are formed by approached and aligned needles (20), whose sides decrease in width from the portion near the base (12') from which they develop vertically up to the top of the structure. The structure also has a supporting frame for the comb-like elements (12), made up by two or more laminations (14) of any form and size, vertically and transversally arranged relatively to the elements (12).

5 Claims, 4 Drawing Sheets

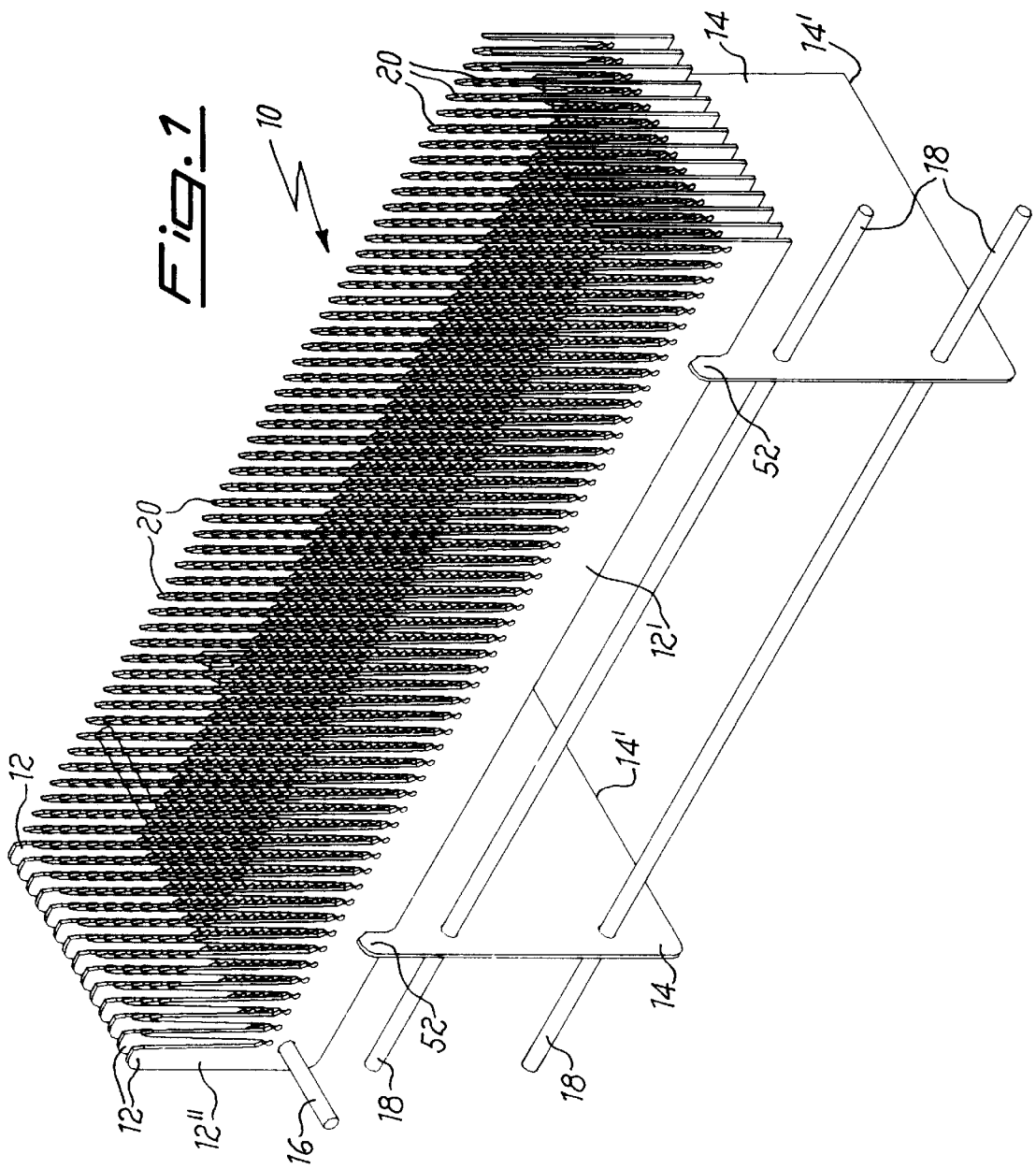

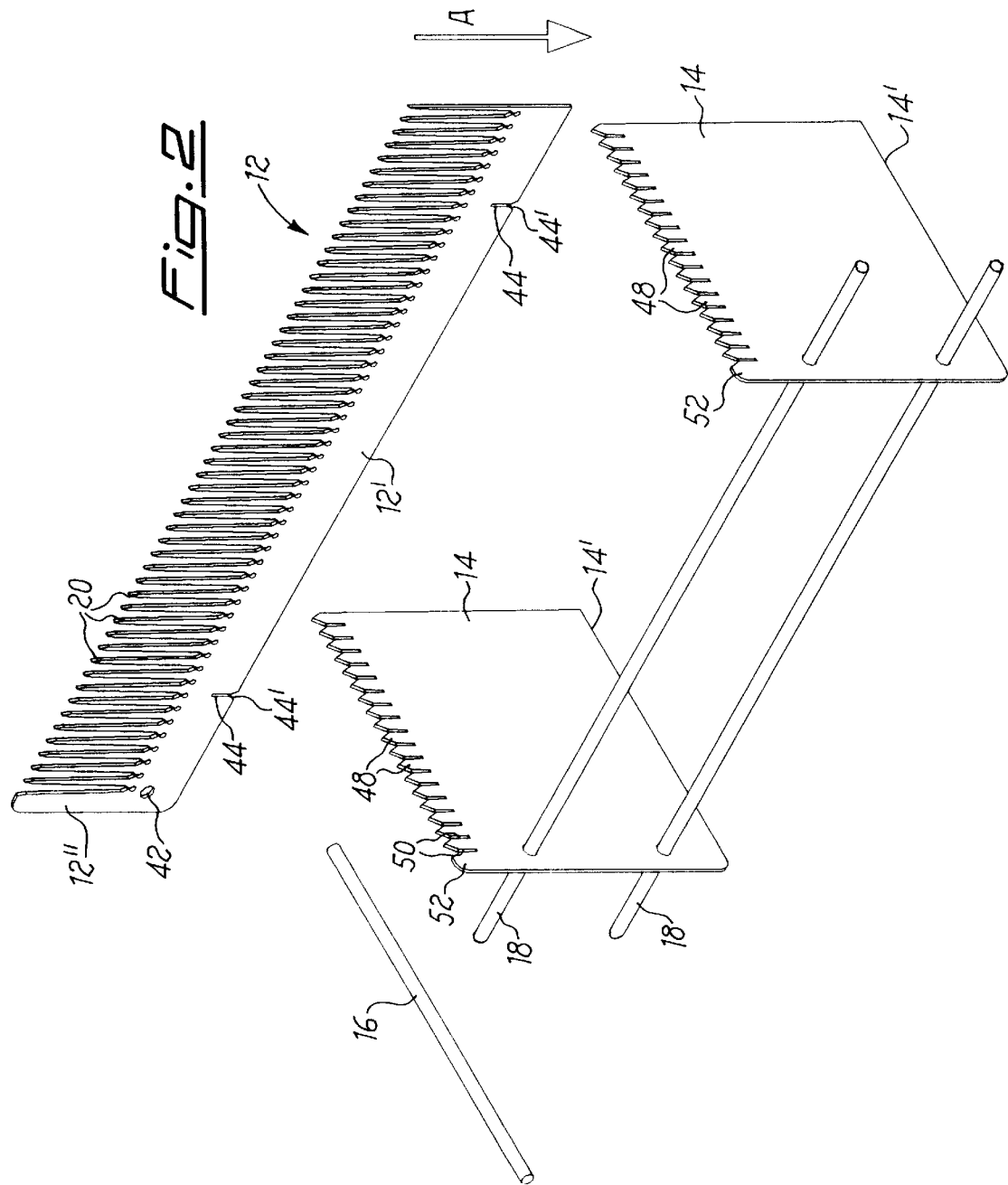

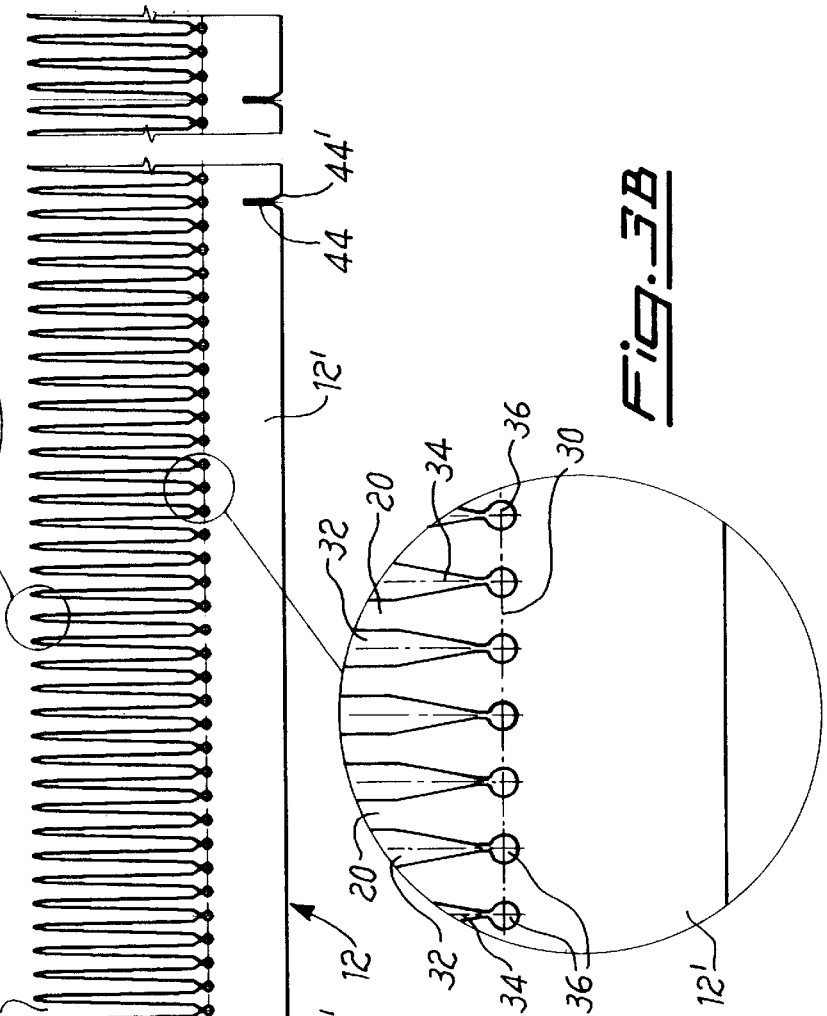

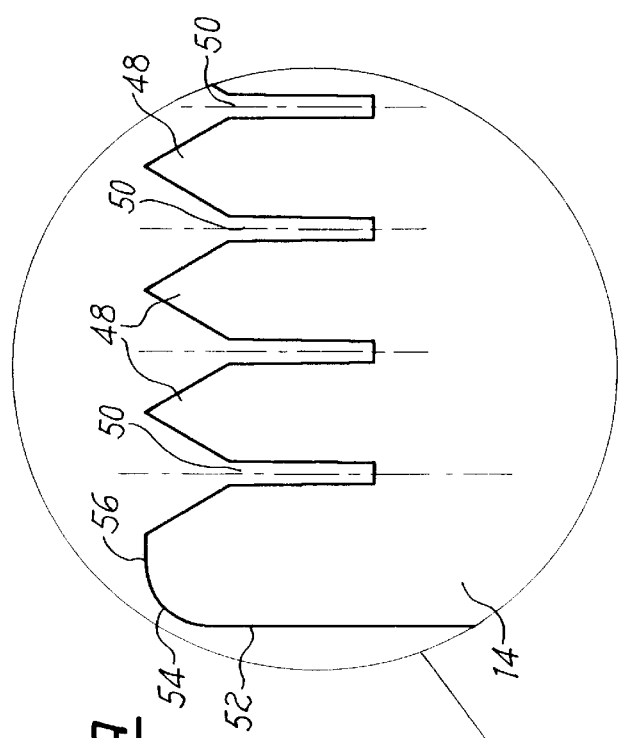
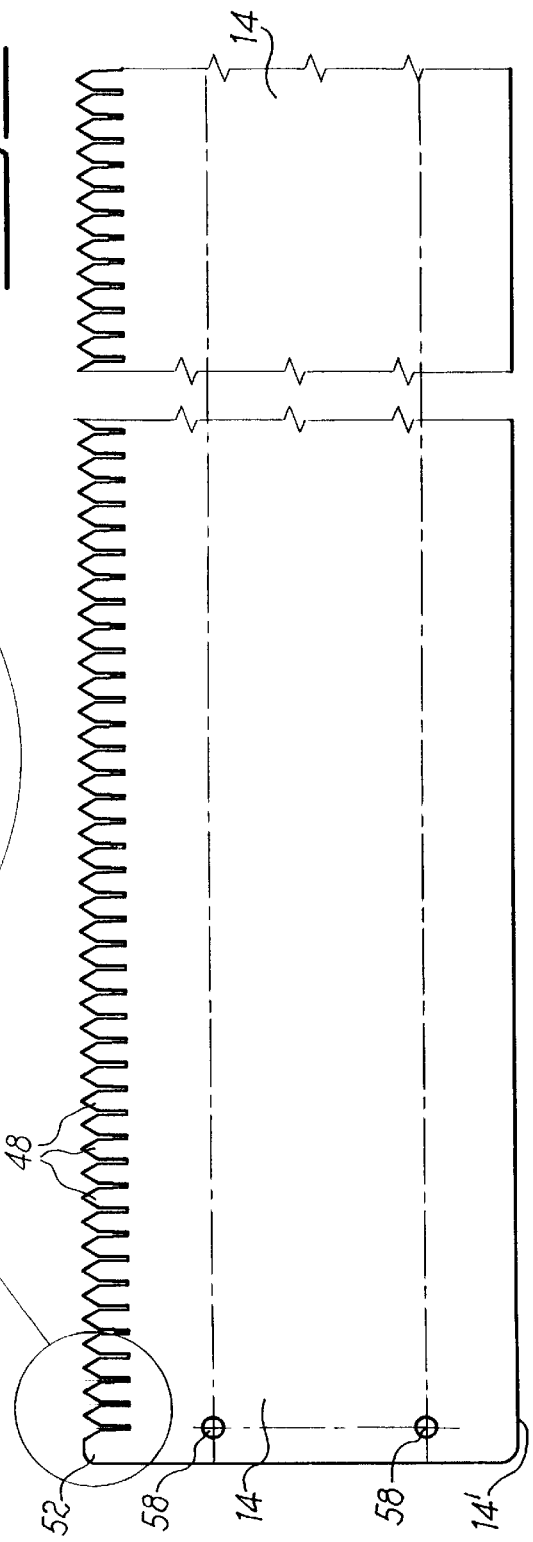

HANDLING AND SUPPORTING STRUCTURE FOR CUTTING MACHINES

FIELD OF THE INVENTION

The present invention relates to a handling and supporting structure for cutting machines. More particularly, the present invention relates to a structure as especially suitable to equip machines that perform leather cutting by means of water jet systems.

BACKGROUND OF THE PRIOR ART

It is known that production of artifacts in footwear and leather goods sectors generally involves, among other preliminary operations, the cutting of the leather that forms the raw material. The artifact, for instance a shoe, is made up by several parts specifically shaped, that are obtained from the leather by means of individual cutting operations. These steps may be carried out by means of hollow punching apparatuses called punchers, or with machines that operate by means of water jets. The known water jet cutting machines are provided with a wide working bench on which lies the leather or hide or possibly synthetic material from which the different shaped parts are obtained. The water jet, coming out at a very high pressure from a small hole of a nozzle connected with a mobile frame located above the working bench relatively to which it is automatically moved, cuts and goes through the leather, obtaining the shaped part. Under the working bench there is formed a water collecting and conveying basin. The working bench or resting top for the leather must be obviously permeable, while showing at the same time sufficient strength characteristics to bear the leather without flexures. The known art conventionally uses for this purpose wire nets or the like, suitably sized meshes of which give rise all the same to a severe drawback. In fact, water, expelled at high pressure from the hole finds a barrier to its flowing in the underlying basin in correspondence of the individual meshes of the net defined by wire or metal straps and unavoidably reverberates and nebulizes. As a consequence, the leather tends to absorb a part of water, especially along the cut edges. To reduce this drawback, there is located on the working benches of said machines, above the wire net, a layer of absorbing material, formed, for instance, by a rubber plate on which the leather is placed. These plates are cut into many shaped parts, as it happens for the overlying leather, and therefore they must be replaced frequently, causing higher production costs. However, the presence of an absorbent layer of this kind is not a final solution to the problem, as leather wets—even though to a limited extent—and the possible traces that remain on the same after drying affect the quality of the artifacts adversely.

SUMMARY OF THE INVENTION

An object of this invention is to obviate the aforementioned drawbacks. More particularly, the object of this invention is to provide a handling and supporting structure for water jet cutting machines, suitable to substantially reduce the effects of water on leathers, hides or synthetic materials.

A further object of the invention is to provide users with a handling and supporting structure that can ensure a high degree of resistance and reliability in time and also such as to be easily and economically made.

These and still other objects are achieved by the handling and supporting structure for cutting machines of the invention, applicable in particular in machines that are used on leathers, hides and synthetic materials cutting operations with the water jet system, said structure comprising a plurality of comb-like elements, starting from a sheet of limited thickness, said elements being parallel to one another or differently oriented and formed by aligned needles close to one another, the sides of which decrease in width from the portion near the base from which they develop vertically up to the top.

The construction and functional characteristics of the handling and supporting structure for cutting machines of the invention will be better understood due to the following description wherein reference is made to the attached drawings which are a preferred non-limiting embodiment of the same, and wherein:

FIG. 1 shows schematically a partial perspective view of the handling and supporting machine of the invention;

FIG. 2 shows schematically an exploded view of the components of the same structure;

FIG. 3 shows schematically a front view of one of the comb-like elements forming the handling and supporting structure;

FIG. 3a shows schematically a magnified detail of the upper end of the needles forming the comb-like elements;

FIG. 3b shows schematically a magnified detail of the lower end of the needles forming the comb-like elements;

FIG. 4 shows schematically a top view of the comb-like element;

FIG. 4a shows schematically the magnified detail of the upper end of the element of the preceding figure;

FIG. 5 shows schematically a side view of one of the supporting laminations of the comb-like elements;

FIG. 5a shows schematically the magnified detail of the supporting lamination of the preceding figure.

With reference to the above figures, the handling and supporting structure for cutting machines of the present invention, indicated as a whole by 10 in FIG. 1 and in the following referred to for the sake of simplicity also as "pallet", is basically made up by a plurality of comb-like elements 12, close to each other, supporting laminations 14 for said elements 12, and means 16, 18, having by way of example the form of circular section bars, which connect respectively elements 12 and laminations 14. Each of the comb-like element 12, preferably made from stainless steel, is made up by a plurality of identical and aligned needles 20, which develop upwards starting from a longitudinally extended strip 12' forming the base of said element 12 for a height comprised, by way of example, between 20 and 40 mm. In correspondence of the opposite heads, the comb-like element 12 is defined by a portion 12" which develops orthogonally from base 12' up to the level of needles 20; the height of base 12' and the width of portion 12" are substantially equivalent, and comprised, by way of example between 8 and 15 mm. The comb-like element is obtained from a metal strip having a thickness comprised between 0.5 and 1.2 mm. The individual needles 20, as shown in FIG. 3 and in more detail in FIGS. 3a and 3b, have a specific configuration, with a side tapering that becomes more marked in correspondence of the upper end forming a point. In particular, the needles 20 reach their maximum width near the point of connection with base 12' of the comb-like element from which they develop, and reduce progressively in width as they approach the upper end. The latter, indicated by 22 in FIG. 3a, defines a further more marked tapering, which form a substantially pointed portion whose opposite oblique sides 24, 26 end with horizontal surface 28 having a markedly limited extension, comprised, by way of example, between 0.2 and 0.4 mm, parallel to base 12'. Vice-versa, near the point of connection with said base 12', needles 20 progressively increase in width, forming a cone-shaped portion 30, schematized in detail in FIG. 3b. Therefore, needles 20 are alternating with empty sectors, indicated by 32, having a form complementary to the form of the needles. The sectors define, in correspondence of the cone-shaped portion 30 of needles 20, a progressive reduction in width, forming in this way a funnel-shaped profile opening 34. The lower end of each of the openings 34, whose width is comprised, by way of example, between 0.1 and 0.5 mm, extends in a portion 36 having, by way of example, a circular development and preferably a diameter equal to or smaller than 2 mm. The circular portions 36 are aligned with one another along the upper front of base 12' of the comb-like element 12, and alternate with the cone-shaped portions 30 formed at the lower end of needles 20. The top of each head 12" of the comb-like element 12 has a configuration like that of the individual needles 20, defining a marked tapering 38, shown in particular in FIG. 4a, that terminates in a horizontal surface 40 having a width preferably comprised between 0.1 and 0.3 mm. Near the apexes formed by base 12' and its opposite vertical extensions 12" forming the heads, each of the comb-like element 12 has a through-hole 42 suitable to house, as will be explained in more details hereinbelow, bar 16, which is the connection and stabilization means for the elements. On the latter, starting from the lower front of base 12' there is formed a plurality of spaced cavities 44, with a stress raising mouth 44', defined, by way of example, by 45° to 90° inclined walls. The width of cavities 44, which develop approximately for half-height of base 12' behind said mouth and parallelly to heads 12", substantially corresponds to the thickness of the supporting laminations 14, which form the housing and the supporting frame of the comb-like elements 20. The laminations 14, advantageously obtained from stainless steel and having a thickness like that of the comb-like elements 12, have a substantially rectangular configuration and a height preferably comprised between 50 and 100 mm, and form the supporting frame of the elements 12 which remain therefore suitably raised relatively to the bottom of the basin for water collection and recirculation (not shown). The upper edge of laminations 14 has advantageously an indentation formed by pointed ends 48, as shown in FIG. 2, having preferably a regular triangular shape, represented in detail in FIG. 5a, alternating with slits 50 orthogonally oriented relatively to the lower edge 14' of the laminations. The slits develop from a line corresponding to the base of the pointed ends, extending in lamination 14 for a limited length, comprised, by way of example, between 3 and 6 mm. The width of slits 50 is substantially equal to the corresponding height of cavities 44, as measured on the part at the back of their stress raising mouth 44', and to the thickness of the comb-like elements 12. Each of the opposite heads 52 of lamination 14 has, on the upper end part indicated by 54 and shown in detail in FIG. 5a, a rounded off profile which is connected to a rectilinear portion 56 of a limited extent, parallel to the lower edge 14' of the lamination. From the end part of the rectilinear portion 56, heads 52 develop angularly downwards to connect with one of slits 50. In a slightly back position relatively to heads 52, there are obtained on laminates 14 couples of superposed through-holes 58, suitable to house bars 18 which connect the laminations with one another, keeping them in a vertical position with the upper indented edge facing upwards. Bars 18 and the further bars 16, which connect the comb-like elements with one another are preferably obtained from stainless steel and have a diameter complementary to the diameter of holes 58, 42 wherein they are pressure-inserted.

FIG. 2 shows that the assembly of the various pallet-forming components, i.e. the comb-like elements 12, laminations 14 and bars 16, 18 is obtained in a very simple, quick and precise way. Laminations 14 are vertically oriented, with the upper indented edge facing upwards and are united with one another by bars 18 inserted in holes 58. The many comb-like elements 12 are orthogonally placed relatively to the laminations, with needles 20 oriented upwards and base 12' inserted in slits 50 formed between the pointed ends 48 of the laminations. In particular, there abut in slit 50 the parts of base 12' of elements 12 provided with cavities 44 with stress-raising mouth 44' as the openings 50 have a width substantially corresponding to the thickness of base 12' of elements 12 and to the width of cavities 44. The elements 12 fit in exactly and are stabilized in openings 50 of laminations 14, following a slight pressure exercised from up downwards indicated by arrow A in FIG. 2.

The so obtained pallet schematized in FIG. 1 is therefore made up by a plurality of needles 20 close to each other, which form the adequate supporting top for the leather to be cut. During the cutting operation, carried out with the water jet system, the high pressure liquid coming out of the nozzle cuts and goes through the leather, making the half-finished product with the desired profile. The water jet that meets the points of needles 20 tapered at the upper end 22 does not reverberate but flows downwards along the sides, also tapered, of the needles and is conveyed, through the funnel profile opening 34, into the underlying circular portions 36 from which it flows into the collection basin. The narrowing defined by the funnel-openings 34 prevents water from going again upwards in a significant amount. The same jet-breaking and anti-reverberation effect is obtained in correspondence of the pointed ends 48 of laminations 14. Therefore, leather is cut without being impregnated or simply covered with a significant amount of water along the cut edge or on the upper or lower surfaces. Needles 20 define the optimum support for the leather with their upper flat limited extension end 28.

As it is clear from the above description, the advantages achieved by the invention are obvious. The handling and supporting structure or pallet of the present invention allows to perform the water jet cutting without damaging the leather and does not require the use of an absorbing layer, which would need a frequent replacement, to be placed under the leather.

However, the invention as described hereinabove has been proposed only by way of example, being understood that the same is susceptible of many modifications and variations all of them falling within the inventive concept. For instance, the comb-like elements may be oriented to one another in the horizontal and/or vertical or oblique direction being more or less spaced relatively to each other and have different sizes and configurations of the needles and cavities for coupling the supporting lamination, with respect to what has been described and illustrated by way of example. Correspondingly the cavities may be more or less spaced relatively to one another, while the indentation formed along the upper edge of the laminations may have a different profile. Besides, the pallet of the present invention may be replaced by modules made up by a reduced number of comb-like elements, couplable through any means with each other and/or the supporting laminations. Besides, the pallet may be utilized also on laser-cutting machines, with comb-like elements and needles possibly from other materials and in the presence of a cutting performed with abrasive-containing water.

What is claimed is:

1. In a cutting machine which performs water jet cutting operations on leathers, hides and synthetic materials, and having a handling and supporting structure (10) for said materials, the improvement comprising:

said handling and supporting structure (10) including a plurality of substantially identical elements (12) formed of stainless steel arranged substantially in parallel, each element (12) having a thickness with a longitudinally extending base (12') having height, a plurality of aligned needles (20) having a height, a plurality of aligned needles (20 having a height, and extending vertically from said base (12'), (12'), and a vertical extensions (12") extending from at least one ends of base (12') to the height of said needles (20), said needles (20) forming cone-shaped portions (30) near the point of connection with base (12') and alternating with empty sectors (32) of a form complementary to the form of needles (20) thereby forming a funnel-shaped profile opening (34) between, adjacent needles (20) which communicates in its lower end through a small opening with a circular underlying portion (36) having a diameter no greater than 2 mm, said portions (36) being aligned along base (12'), said handling and supporting structure (10) further including at least two laminations (14) vertically and transversely arranged relative to said elements (12), and at least two spaced cavities (44) formed in a lower face of base (12') of each element (12), each cavity (44) having a stress relieving mouth (44'), a length of at least a third the height of base (12'), and a width substantially corresponding to the thickness of lamination (14), each of said at least two laminations (14) being engaged by the corresponding cavity (44) of said at least two spaced cavities (44) of each element (12).

2. The cutting machine as defined in claim 1, wherein the laminations (14) of said handling and supporting structure (10) are formed of stainless steel and have a thickness equivalent to the thickness of elements (12), are substantially rectangular in shape having a height between 50 and 100 mm, have an upper edge comprising indentations formed by pointed ends (48) alternating with vertical slits (50) having a width equivalent to the thickness of elements (12), whereby each slit (50) engages with the cavity (44) of the element (12).

3. The cutting machine as defined in claim 2, wherein slits (50) have a length between 3 and 6 mm.

4. The cutting machine as defined in claim 3, wherein the laminations (14) of said handling and supporting structure (10) each have opposing ends (52) having a rounded profile in an upper part (54) connected with a rectilinear portion (56) of limited extent and defining a profile angularly oriented downwardly connecting with one of said slits (50).

5. The cutting machine as defined in claim 4, wherein each of said at least two laminations (14) is provided with at least one through-hole (58) for receiving a bar (18) connecting said laminations (14).

* * * * *